United States Patent
Matsumoto

(10) Patent No.: US 6,215,877 B1
(45) Date of Patent: Apr. 10, 2001

(54) KEY MANAGEMENT SERVER, CHAT SYSTEM TERMINAL UNIT, CHAT SYSTEM AND RECORDING MEDIUM

(75) Inventor: Tatsuro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/158,880

(22) Filed: Sep. 23, 1998

(30) Foreign Application Priority Data

Mar. 20, 1998 (JP) .................................. 10-072728

(51) Int. Cl.[7] ...................................................... H09L 9/30

(52) U.S. Cl. .................. 380/277; 380/279; 380/282; 713/163; 713/171; 713/201

(58) Field of Search ..................... 380/277, 279, 380/282; 713/150, 155, 156, 162, 163, 171, 201

(56) References Cited

U.S. PATENT DOCUMENTS

| | | | | |
|---|---|---|---|---|
| 4,578,531 | * | 3/1986 | Everhart et al. | 380/282 |
| 4,965,804 | * | 10/1990 | Trbovich et al. | 713/193 |
| 5,003,593 | * | 3/1991 | Mihm, Jr. | 713/156 |
| 5,309,516 | * | 5/1994 | Takaragi et al. | 380/45 |
| 5,325,433 | * | 6/1994 | Torii et al. | 380/30 |
| 5,495,533 | * | 2/1996 | Linehan et al. | 713/155 |
| 5,784,464 | * | 7/1998 | Akiyama et al. | 713/155 |
| 5,832,092 | * | 11/1998 | Okuda et al. | 380/279 |

FOREIGN PATENT DOCUMENTS 10-190729    7/1998    (JP) .

* cited by examiner

Primary Examiner—Gilberto Barron, Jr.
(74) Attorney, Agent, or Firm—Staas & Halsey LLP

(57) ABSTRACT

A key management server is arranged at the same position as a terminal unit as viewed from a chat server. A channel secret key unique to each channel is generated by the key management server and distributed to a chat client so that the communication can be kept secret, even when a chat server low in reliability is used.

20 Claims, 11 Drawing Sheets

KEY MANAGEMENT SERVER, CHAT SYSTEM TERMINAL UNIT, CHAT SYSTEM AND RECORDING MEDIUM

BACKGROUND OF THE INVENTION

The present invention relates to a chat system for performing the communication real time using a character or the like, a chat system terminal unit, a key management server for supplying a key to the encryption of the communication, and a recording medium readable between computers on a computer network such as the internet or the intranet.

FIG. 1 is a diagram for explaining the principle of a conventional chat system. In this chat system, communication channels A to C (51 to 53) are opened on a chat server 50 connected to a computer network. The user connects the chat server 50 by chat clients (terminal units) 60 to 69 and thus selectively connects the channels A to C (51 to 53). As a result, the communication using a character or the like can be accomplished between users connected to the same channel. Generally, the information transmitted from a user is distributed to all the users connected to the same channel. Also, even on a channel connected with three or more users, one-to-one communication between users is possible.

FIG. 2 is a block diagram showing a configuration example of the essential parts of the conventional chat system. In this chat system, first, an input unit 14 of a chat client 5 receives an input signal from a keyboard (not shown). In FIG. 2, only a single chat client 5 is shown as a representative. An input signal received by the input unit 14 is transmitted by a transmission section 16 to a channel X(4) which, in the chat server 2 is selected by a channel selection section 10. A signal arriving from other chat clients through the channel X(4) in the chat server 2 is received by a receiving section 17. The signal received by the receiving section 17 is output by an output unit 19 to and is displayed on a display screen (not shown).

In this chat system, the communication between the chat client and the chat server is carried out in a plaintext and therefore a communication text is liable to be eavesdropped midway of the communication line.

A method suggested for preventing the eavesdropping is to encrypt the communication text using a secret key prepared by a chat server. FIG. 3 is a block diagram showing an example configuration of the essential parts of a conventional chat system with the communication text encrypted. The chat server 7 of the chat system includes a channel secret key generation section 34, an encryption section 33, a channel secret key request receiving section 31 and a channel secret key distribution section 32. The channel secret key generation section 34 generates a channel secret key unique to each channel for encrypting/decrypting the communication data exchanged through a channel in the server 7 managed by the server 7. The encryption section 33 encrypts the channel secret key generated by the channel secret key generation section 34. The channel secret key request receiving section 31 receives a distribution request of the channel secret key unique to the channel X(4) from a chat client 6 through the channel X(4). When the channel secret key request receiving section 31 receives the distribution request, the channel secret key distribution section 32 distributes the channel secret key unique to the channel X(4) encrypted by the encryption section 33 to the chat client 6 through the channel X(4). In FIG. 3, only one chat client 6 is shown to represent all chat clients.

The chat client 6 of the chat system includes a channel selection section 10 for selecting a connected channel, a channel secret key request section 11 for requesting a channel secret key unique to the channel X(4) through the channel X(4) selected by the channel selection section 10, a channel secret key receiving section 12 for receiving the channel secret key requested by the channel secret key request section 11, a channel secret key decryption section 13 for decrypting the channel secret key received by the channel secret key receiving section 12, and an input unit 14 for receiving the input signal from a keyboard (not shown).

The client 6 of the chat system includes an encryption section 15 for encrypting the input signal received by the input unit 14 using the channel secret key decrypted by the channel secret key decryption section 13, a transmission section 16 for transmitting the input signal encrypted by the encryption section 15 to the channel X(4), a receiving section 17 for receiving the signal arriving from other channel clients through the channel X(4), a decryption section 18 for decrypting the signal received by the receiving section 17 using the channel secret key, and an output unit 19 for outputting and displaying the received signal decrypted by the decryption section 18 in the form of character on a display screen (not shown).

With the chat system having this configuration, the chat server 7 generates a secret key of each channel at the channel secret key generation section 34 and encrypts the channel secret key at the encryption section 33.

The chat client 6 selects the connected channel at the channel selector 10, and the channel secret key request section 11 requests the chat server 7 for a channel secret key unique to the channel X(4) through the channel X(4) selected by the channel secret key request section 11. The chat server 7 accepts the request at the channel secret key request receiving section 31 and distributes the encrypted channel secret key unique to the channel X(4) to the chat client 6 through the channel X(4).

The chat client 6 receives the requested channel secret key unique to the channel X(4) at the channel secret key receiving section 12, and decrypts the received channel secret key at the channel secret key decryption section 13. The chat client 6 encrypts/decrypts the signal transmitted/received to and from the channel X(4) at the encryption section 15/decryption section 18 using the decrypted channel secret key.

In the above-mentioned chat system, however, the communication text on the chat server 7 can be modified into a plaintext and eavesdropped by reconstructing the chat server 7. Even when the plaintext is encrypted by the secret key prepared by the chat server, therefore, the likelihood of eavesdropping is not eliminated.

BRIEF SUMMARY OF THE INVENTION

The present invention is intended to solve the above-mentioned problems and the object thereof is to provide a key management server, a chat system terminal unit, a chat system and a recording medium for realizing the chat system and the terminal unit thereof which are capable of keeping a communication secret even in the case where the chat server is low in reliability.

According to the present invention, there is provided a key management server comprising means for generating a channel secret key unique to each channel for encrypting/decrypting the communication data exchanged through a plurality of channels managed by one or more chat servers, means for encrypting the channel secret key generated by the channel secret key generation means, means for receiving the distribution request of the channel secret key unique to a channel through the channel managed by the chat server from a second terminal unit, and means for distributing the channel secret key unique to the channel encrypted by the encryption means to the second terminal unit through the same channel.

In view of the fact that like the chat client, the key management server constituting a terminal unit as viewed from the chat server generates a channel secret key unique to each channel, the communication can be kept secret even when a chat server low in reliability is used.

Also, in the key management server according to this invention, the channel secret key generation means generates the channel secret key unique to each of the groups which is divided so as to include a plurality of terminal units in the channel, and the receiving means receives the distribution request for the channel secret key for each group from the second terminal unit.

Therefore, the communication can be kept secret for each group in the same channel.

Further, the key management server according to this invention comprises a public key acquisition means for acquiring a public key unique to a user from an external unit, and when the receiving means receives a distribution request, the encryption means encrypts the channel secret key generated by the channel secret key generation means using the public key unique to the user requesting the distribution acquired by the public key acquisition means.

In view of the fact that the public key acquisition means acquires a public key unique to the user from an external unit, the communication can be kept secret even in the case where a chat server low in reliability is used.

Further, the public key acquisition means acquires the public key when the second terminal unit is connected to the channel managed by the chat server.

Consequently, the channel secret key can be encrypted and distributed to the terminal unit by the public key.

Further, in the key management server according to this invention, the public key acquisition means acquires the public key from the second terminal unit and registers the public key and the user name thereof when connected to the channel managed by the chat server.

Therefore, the channel secret key can be encrypted and distributed to the terminal unit by this public key.

Furthermore, with the key management server according to the invention, the receiving means receives the authentication information of the user together with the distribution request for the channel secret key, judges whether the user authentication information received is correct or not, and when correct, accepts the distribution request.

As a result, the channel secret key is not distributed to outsiders, so that even when using a channel server of low reliability, the communication is kept secret.

Further, with the key management server according to this invention, the channel secret key generation means generates a channel secret key based on the information from time to time, the information unique to each channel and the secret information or the random information held only by the terminal associated with the key management server.

Therefore, it is difficult to duplicate the channel secret key illegally, so that even in the case where a chat server low in reliability is used, the communication can be kept secret.

Further, the channel secret key generation means of the key management server according to the invention generates again at a predetermined chance the channel secret key generated and distributed, and the distribution means distributes the channel secret key generated again by the channel secret key generation means.

Consequently, the channel secret key, even if illegally duplicated, becomes invalid within a short time. Even in the case where a chat server of low reliability is used, therefore, the communication can be kept secret.

Furthermore, in the key management server according to the invention, the public key acquisition means holds the acquired public key for a predetermined length of time.

With this key management sever, the public key acquisition means holds the acquired public key for a predetermined length of time, and therefore, it is not necessary to acquire the related public key each time the terminal unit is connected to the channel.

Further, in the key management server according to the invention, when the user of the public key acquired by the public key acquisition means is connected to a plurality of channels, the encryption means encrypts the channel secret key unique to each channel using the same public key for any channel.

As a result, the user is not required to have a public key and the public key acquisition means can easily manage the acquired public key.

Furthermore, the key management server according to the invention comprises second receiving means for receiving the public key distribution request from the remote user of the second terminal unit through the channel managed by the chat server and second distribution means for distributing the public key acquired by the public key acquisition means to the second terminal unit when the second receiving means accepts the distribution request.

Therefore, one-to-one communication is possible while keeping secret within a channel including at least three terminal units connected therein.

Also, the chat system terminal unit according to the invention includes means for generating a session key for encrypting/decrypting the communication data at the time of one-to-one communication in the channel managed by the chat server, means for requesting the public key to the key management server for distributing the public key to the remote user through the channel managed by the chat server, means for receiving the public key requested for by the public key requesting means, encryption means for encrypting the session key generated by the session key generation means using the public key received by the receiving means, and means for distributing the session key encrypted by the encryption means to the terminal unit of the remote user through the channel.

In this way, the communication data is encrypted/decrypted by the session key thus distributed to conduct the one-to-one communication with the terminal unit of the remote user. Therefore, the one-to-one communication can be conducted while keeping secret within the channel including three or more terminal units connected.

Further, the chat system terminal unit according to the invention comprises means for encrypting the communication data using the channel secret key unique to each channel distributed from the key management server for encrypting/decrypting the communication data exchanged through each of a plurality of channels managed by one or more chat servers, means for outputting the communication data encrypted by the encryption means in addition to the information identifying the encryption to the channel managed by the chat server, and means for decrypting the communication data by the channel secret key when the information identifying the encryption is added to the communication data received from the channel.

As a result, the communication data requiring secret can be encrypted while the communication data requiring no secret can be communicated in the form of a plaintext.

Further, the chat system according to this invention comprises at least selected two of the key management server, the chat system terminal unit and the chat server.

Therefore, the communication can be kept secret without resorting to the reliability of the chat server.

Furthermore, a computer memory product according to the invention comprises first computer readable program code means for causing a computer to generate a channel secret key unique to each channel for encrypting/decrypting the communication data exchanged through the channel managed by one or more chat servers, second computer readable program code means for causing the computer to receive a distribution request for the channel secret key unique to each channel from one terminal unit through the channel managed by the chat server, and third computer readable program code means for causing the computer to distribute the channel secret key unique to the channel generated by the first computer program code means through the channel to the terminal unit when the second computer program code means receives the distribution request.

As described above, with the computer controlled by this computer program, the channel secret key unique to each channel is generated and is distributed to the terminal unit, so that the communication can be kept secret even when a chat server of low reliability is used.

Further, the computer memory product according to the present invention comprises fourth computer readable program code means for causing the computer to acquire the public key unique to the user from an external unit, and fifth computer readable program code means for causing the computer to encrypt the channel secret key generated by the first computer program code means using the public key unique to the user requesting the distribution acquired by the fourth computer program code means, wherein the second computer program code means distributes the channel secret key encrypted by the fifth computer program code means to the terminal unit through the channel.

Therefore, the computer controlled by this computer program which acquires the public key unique to the user from an external unit can keep the communication secret even in the case where the reliability of the chat server used by it is low.

The above and further objects and features of the invention will more fully be apparent from the following detailed description taken with accompanying drawings.

DETAILED DESCRIPTION OF THE INVENTION

First, the principle and the gist of a chat system according to the invention will be described briefly with reference to the accompanying drawings.

Figure 1:
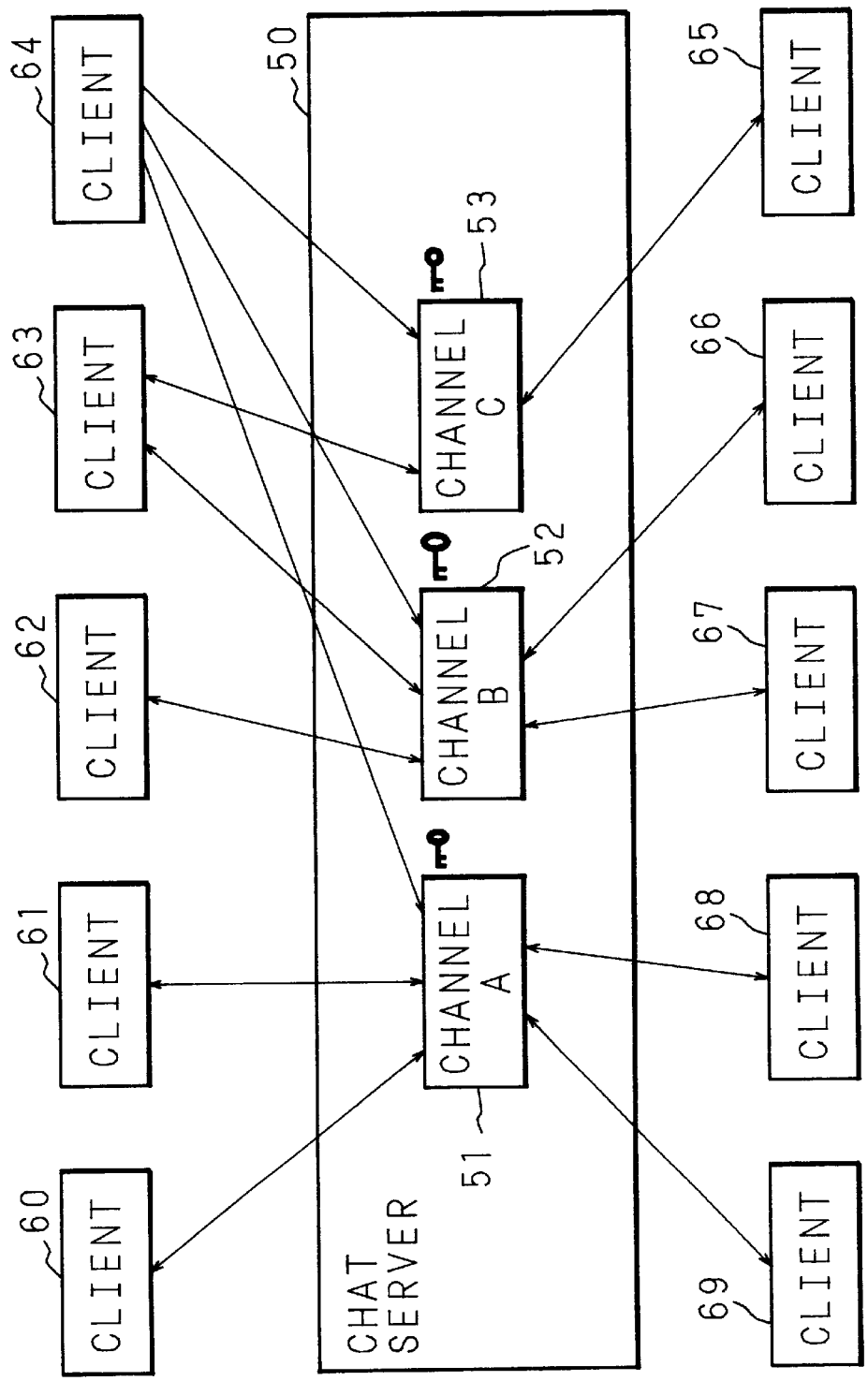
FIG. 1 is a diagram for explaining the principle of a conventional chat system.
Figure 2:
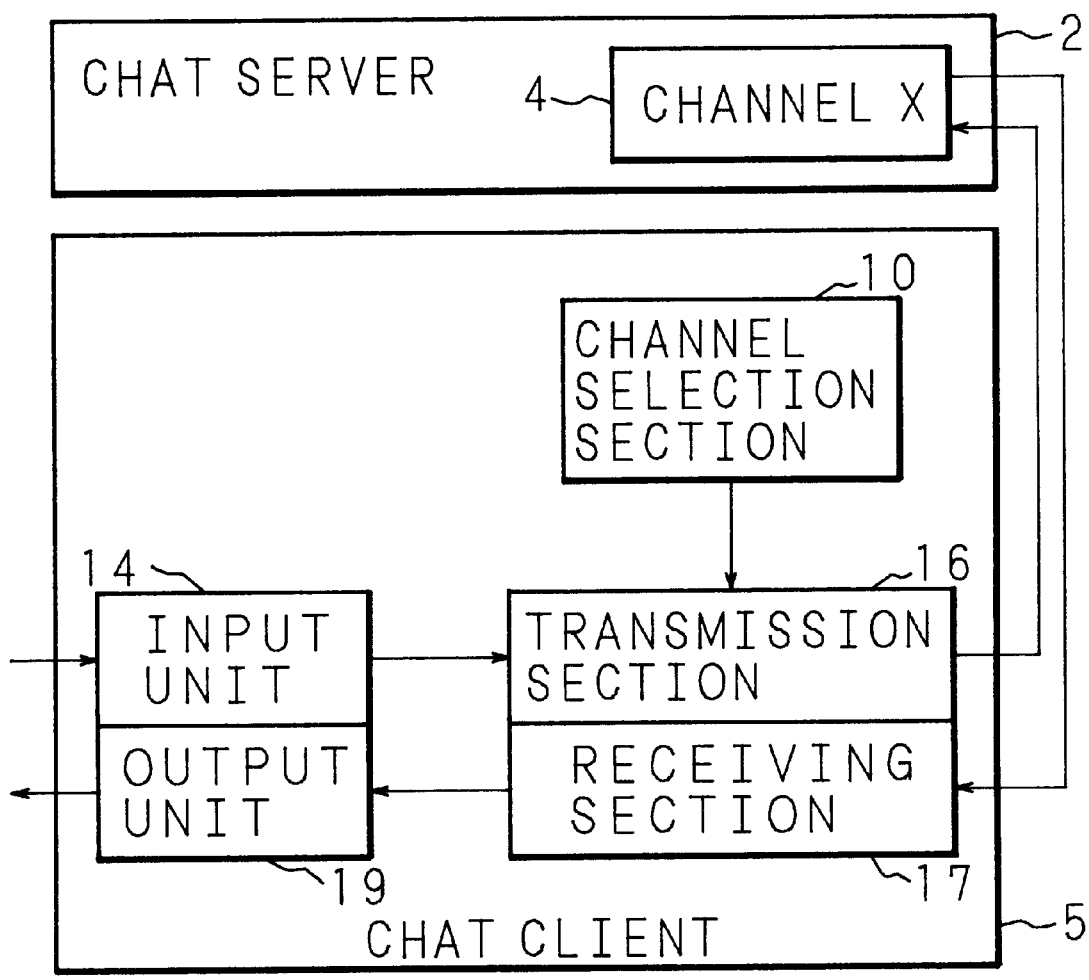
FIG. 2 is a block diagram showing an example configuration of the essential parts of a conventional chat system.
Figure 3:
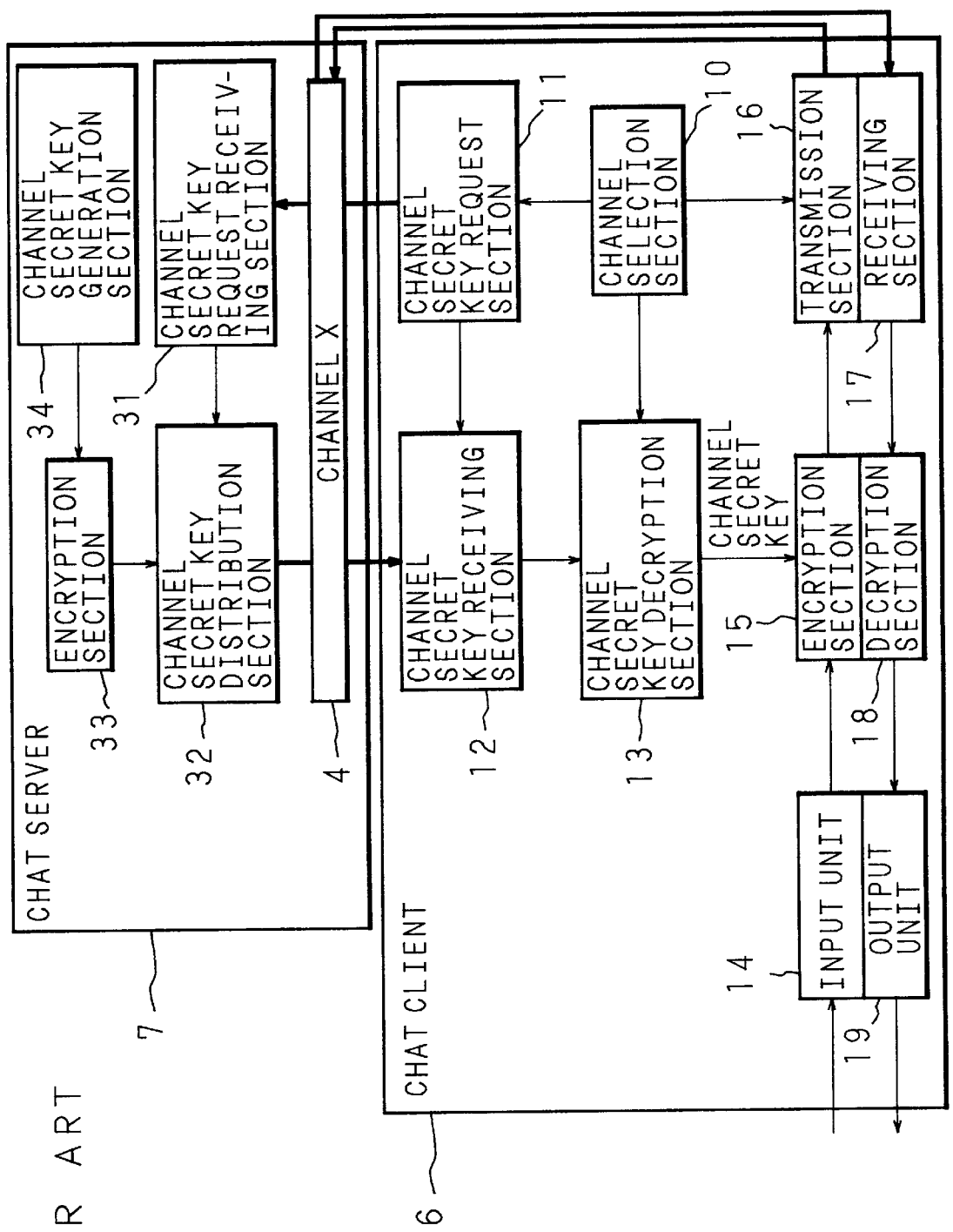
FIG. 3 is a block diagram showing an example configuration of the essential parts of a conventional chat system.
Figure 4:
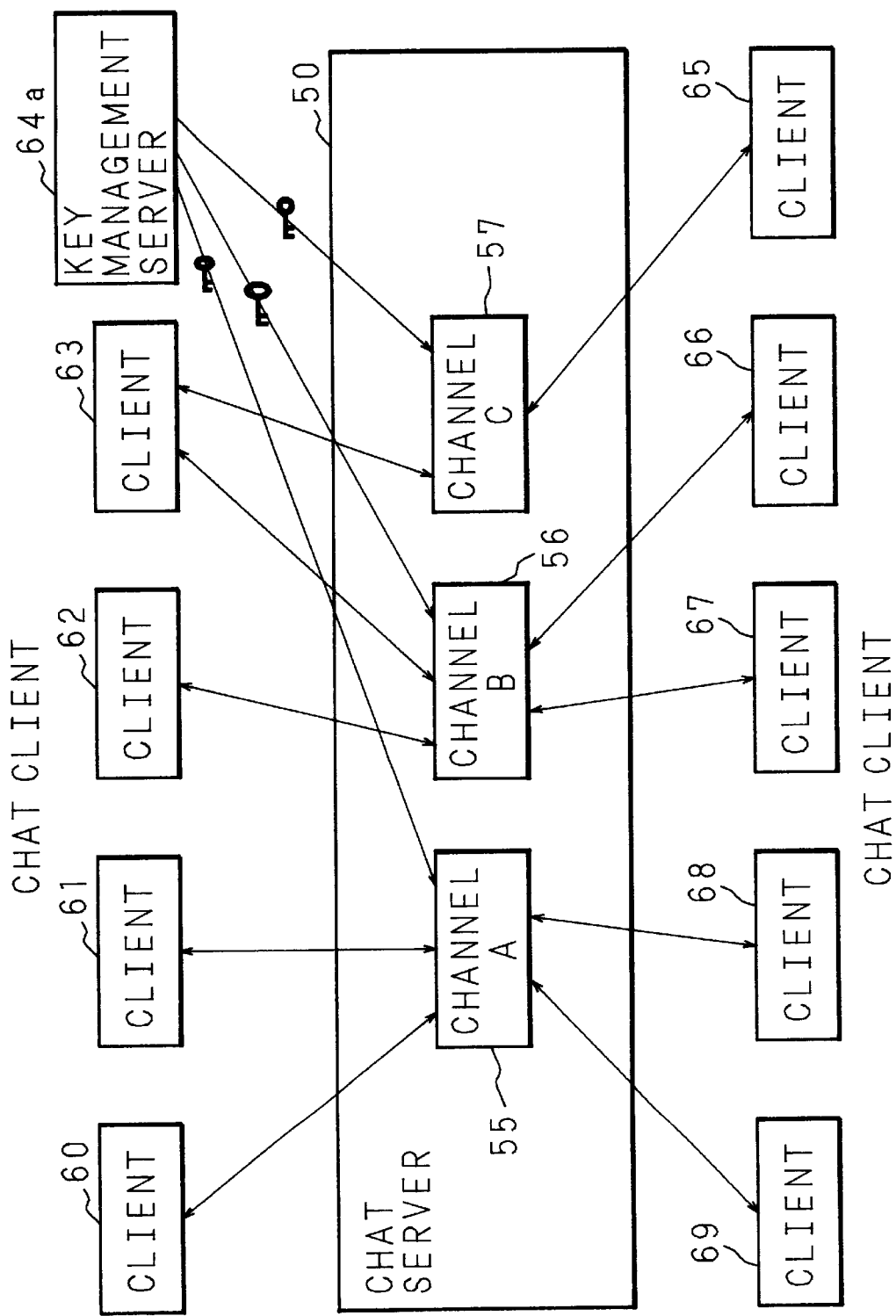
FIG. 4 is a diagram for explaining the principle of the chat system according to the invention.

FIG. 4 is a diagram for explaining the principle of a chat system according to this invention. In this chat system, communication channels A to C (55 to 57) are opened on a chat server 54 connected to a computer network. The user connects to the chat server 54 by chat clients (terminal units) 60 to 63, 65 to 69, and selectively connects to the channels A to C (51 to 53). The channel secret key unique to each of the channels A to C is generated by a key management server 64a constituting a client (terminal unit) equivalent to the chat clients 60 to 63, 65 to 69. In response to a distribution request from the chat clients 60 to 63, 65 to 69, the channel secret keys unique to the channels A to C connected with the chat clients 60 to 63, 65 to 69, respectively, are distributed. In other words, an encryption scheme sharing the same secret key is employed between the chat clients 60 to 63, 65 to 69 connected to the channels A to C.

Figure 5:
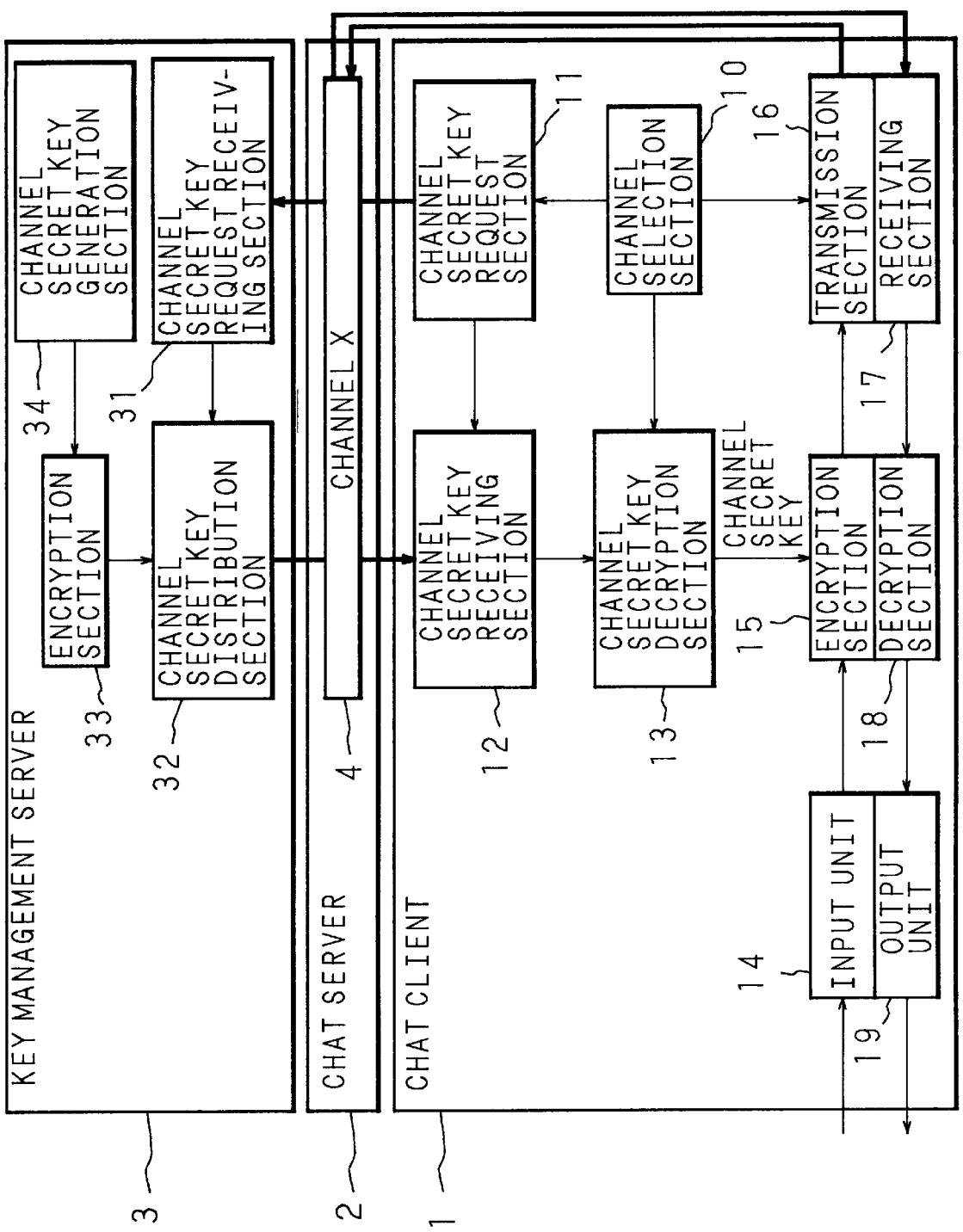
FIG. 5 is a block diagram showing an example configuration of the essential parts of a key management server, a chat system terminal unit and a chat system according to the invention.

FIG. 5 is a block diagram showing an example configuration of the essential parts of a key management server, a chat system terminal unit and a chat system according to this invention. In the key management server 3 of this chat system, the channel secret key generated by the channel secret key generation section 34 is encrypted by the encryption section 33. When the channel secret key request receiving section 31 receives the distribution request of the channel secret key unique to the channel X(4) from the chat client 1 through the channel X(4), the channel secret key distribution section 32 distributes the channel secret key encrypted by the encryption section 33 to the chat client 1 through the channel X(4). In FIG. 5, the chat client 1 alone is shown to represent all the chat clients.

In the chat client 1 of this chat system, the channel secret key unique to the channel X(4) requested by the channel secret key request section 11 through the channel X(4) selected by the channel selection section 10 is received by the channel secret key receiving section 12. The channel secret key received by the channel secret key receiving section 12 is decrypted by the channel secret key decryption section 13.

The input signal received by the input unit 14 is encrypted by the encryption section 15 using the channel secret key decrypted by the channel secret decryption section 13, and the input signal thus encrypted is transmitted by the transmission section 16 to the channel X(4).

The signal transmitted from other chat clients through the channel X(4) is received by the receiving section 17. The signal received by the receiving section 17 is decrypted by the decryption section 18 using the channel secret key. The received signal decrypted by the decryption section 18 is converted into a character by the output unit 19 and displayed on a display screen (not shown).

In this way, the key management server 3 is located at the same position as the chat client 1 as viewed from the chat server 2, and the channel secret key unique to each channel is generated, encrypted and applied to the chat client 1. Thus, the communication can be kept secret even when using a chat server of low reliability.

Now, various embodiments of the invention will be specifically described below.

Embodiment 1

Figure 6:
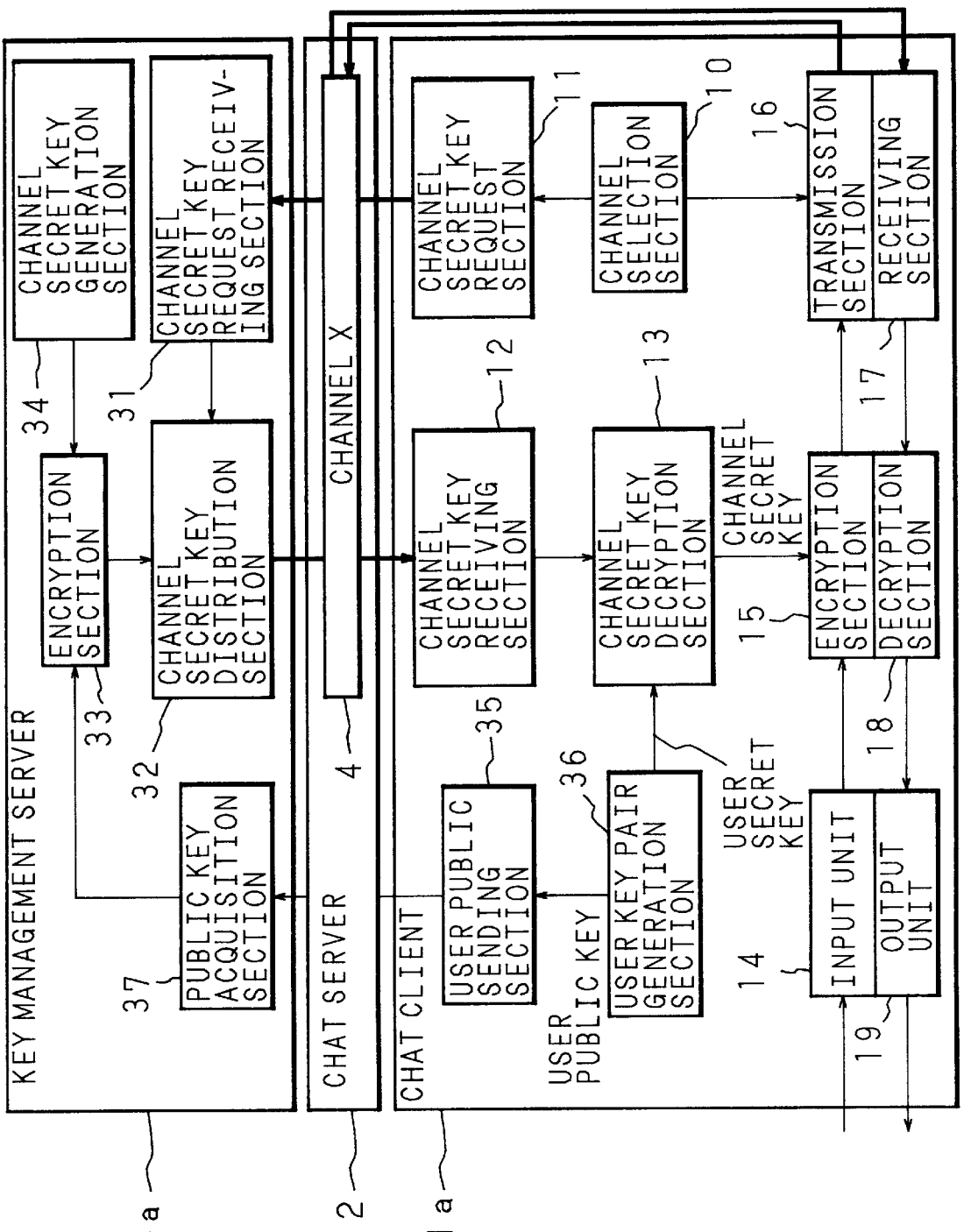
FIG. 6 is a block diagram showing an example configuration of a chat system according to a first embodiment.

FIG. 6 is a block diagram showing a configuration of the essential parts according to a first embodiment of a key management server, a chat system terminal unit and a chat system according to the invention. In FIG. 6, the chat server 2, the key management server 3a and a single chat client 1a are equivalent to the chat server 54, the key management server 64a and the chat clients 60 to 63, 65 to 69 of the chat system shown in FIG. 4, respectively, of which the essential parts are shown in detail. This key management server 3a provides a chat system terminal unit comprising a channel secret key generation section 34 (channel secret key generation means), a public key acquisition section 37 (public key acquisition means), an encryption section 33 (encryption means), a channel secret key request receiving section 31 (receiving means) and a channel secret key distribution section 32 (distribution means).

The channel secret key generation section 34 generates a channel secret key unique to each channel for encrypting/decrypting the communication data exchanged through each of a plurality of channels managed by one or more chat servers. The public key acquisition section 37 acquires the public key unique to the user from the chat client 1a through the chat server 2 and registers the public key together with the user name when the chat client 1a is connected to the channel X(4) managed by the chat server 2.

The encryption section 33 encrypts the channel secret key generated by the channel secret key generation section 34 using the public key unique to the user acquired by the public key acquisition section 37. The channel secret key request receiving section 31 receives the distribution request of the channel secret key unique to the channel X(4) from the chat client 1a through the channel X(4). When the channel secret key request receiving section 31 receives the distribution request, the channel secret key distribution section 32 distributes the channel secret key unique to the channel X(4) encrypted by the encryption section 33 to the chat client 1a through the channel X(4). It is not necessarily a single chat server to which the key management server 3a is connected and of which the channel secret key of each channel is managed by the key management server 3a.

The chat client 1a includes a channel selection section 10 for selecting the channel connected, a channel secret key request section 11 for requesting the channel secret key unique to the channel X(4) through the channel X(4) selected by the channel selection section 10, a user key pair generation section 36 for generating the pair of the public key and the secret key unique to the user, a user public key sending section 35 for sending out the public key (user public key) generated by the user key pair generation section 36 to the key management server 3a through the chat server 2 when the chat client 1a is connected to the channel X(4), a channel secret key receiving section 12 for receiving the channel secret key requested by the channel secret key request section 11, and a channel secret key decryption section 13 for decrypting the channel secret key received by the channel secret key receiving section 12 using the secret key (user secret key) generated by the user key pair generation section 36.

The chat client 1a includes an input unit 14 for receiving the input signal from the keyboard (not shown), an encryption section 15 for encrypting the input signal received by the input unit 14 using the channel secret key decrypted by the channel secret key decryption section 13, a transmission section 16 for transmitting the input signal encrypted by the encryption section 15 to the channel X(4), a receiving section 17 for receiving the signal arriving from other chat clients through the channel X(4), a decryption section 18 for decrypting the signal received by the receiving section 17 using the channel secret key, and an output unit 19 for converting into a character, outputting and displaying on a display screen (not shown) the received signal decrypted by the decryption section 18.

Now, the operation of the chat system having this configuration will be explained.

When the chat client 1a is connected to the channel X(4), the encryption section 33 of the key management server 3a encrypts the channel secret key generated by the channel secret key generation section 34 using the public key acquired by the public key acquisition section 37 from the chat client 1a. When the channel secret key request receiving section 31 receives the distribution request of the channel secret key unique to the channel X(4) from the chat client 1a through the channel X(4), the channel secret key distribution section 32 distributes the channel secret key unique to the channel X(4) encrypted by the encryption section 33 to the chat client 1a through the channel X(4).

In the chat client 1a, the user key pair generation section 36 generates the pair of the public key and the secret key unique to the user, and when the chat client 1a is connected to the channel X(4) selected by the channel selection section 10, the user public key sending section 35 sends out the public key generated by the user key pair generation section 36 to the key management server 3a through the chat server 2.

The channel secret key request section 11 of the chat client 1a requests the channel secret key unique to the channel X(4) from the key management server 3a, and the channel secret key receiving section 12 receives the channel secret key requested thereby. The channel secret key received by the channel secret key receiving section 12 is decrypted by the channel secret key decryption section 13 using the secret key generated by the user key pair generation section 36.

The input signal received by the input unit 14 is encrypted by the encryption section 15 using the channel secret key decrypted by the channel secret key decryption section 13, and the encrypted input signal is transmitted to the channel X(4) by the transmission section 16.

The signal arriving from other chat clients through the channel X(4) is received by the receiving section 17. This signal is decrypted by the decryption section 18 using the channel secret key, and the received signal decrypted by the decryption section 18 is converted into a character by the output unit 19 and displayed on a display screen (not shown).

The channel secret key generation section 34 of the key management server 3a generates a channel secret key for each of a plurality of groups into which the chat clients are segmented in the channel managed by the chat server 2. The encryption section 33 encrypts the channel secret key generated by the channel secret key generation section 34 using the public key acquired by the public key acquisition section 37 from the chat client of the particular group. When the channel secret key request receiving section 31 receives the distribution request for the encrypted channel secret key, the channel secret key distribution section 32 distributes the encrypted channel secret key to the chat client 1a through the channel X(4).

Embodiment 2

Figure 7:
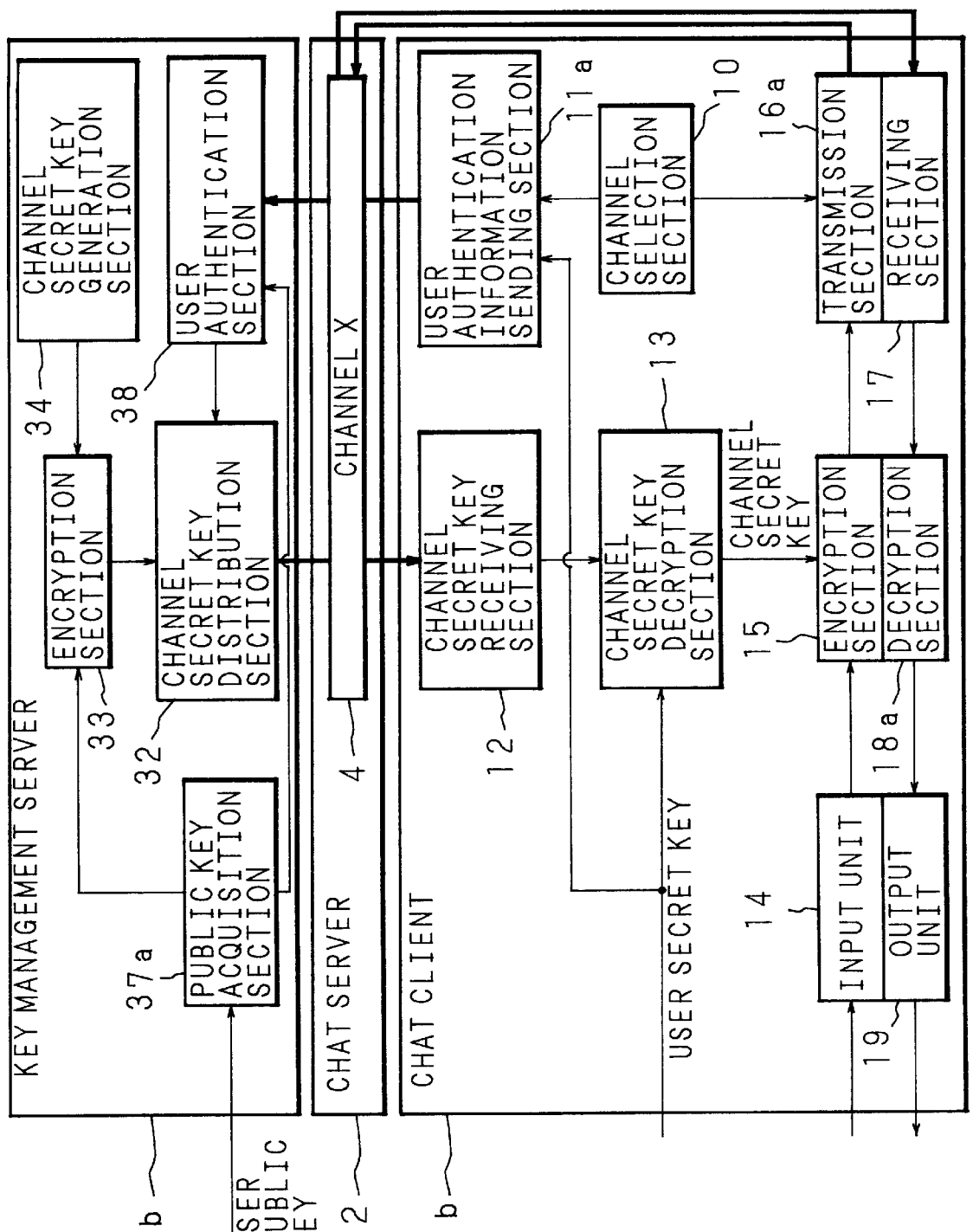
FIG. 7 is a block diagram showing an example configuration of a chat system according to a second embodiment.

FIG. 7 is a block diagram showing a configuration of the essential parts of a key management server, a chat system terminal unit and a chat system according to a second embodiment of the invention. This key management server 3b includes a channel secret key generation section 34 and a public key acquisition section 37a. The channel secret key generation section 34, likewise the first embodiment, generates a channel secret key unique to each channel for encrypting/decrypting the communication data exchanged through each of a plurality of channels managed by one or more chat servers. The public key acquisition section 37a acquires the public key unique to the user from the public key management server (not shown) for managing the public key externally when the chat client 1b is connected to the channel X(4) managed by the chat server 2.

The key management server 3b includes an encryption section 33 and a user authentication section 38 (receiving means). The encryption section 33 encrypts the channel secret key generated by the channel secret key generation section 34 using the public key unique to the user acquired by the public key acquisition section 37a. The user authentication section 38 first receives the user authentication information together with a distribution request of the channel secret key unique to the channel X(4) from the chat client 1b. The user authentication information is the one encrypted using the user secret key at the chat client 1b and further encrypted using the public key of the key management server 3b acquired from the public key management server (not shown). The authentication information thus received is decrypted using the secret key of the key management server 3b and the public key of the user, and it is determined whether the decrypted authentication information is correct or not. In the case where the authentication information is correct, the distribution request of the channel secret key is accepted.

The fact that the correct authentication information can be obtained by decryption using the public key of the user shows that the authentication information has been encrypted by the secret key of the user, i.e. that it is the authentication information sent from the user himself.

Instead of the real-time user authentication described above, the user information and the public key can be registered in advance for the manager of the key management server 3b by another method such as an off-line. In the case where the public key of the user is registered in the key management server 3b in advance or in the case where the key management server 3b can acquire the public key of the user from the public key management server through another route, the key management server 3b generates a random number and thus encrypting the random number using the public key, transmits the encrypted public key to the chat client 1b. A challenge and response system can be conceived in which the chat client 1b decrypts the secret key of the user, and further, the authentication information can be encrypted with the public key of the key management server 3b, and returned to the key management server 3b.

The key management server 3b includes a channel secret key distribution section 32 (distribution means). When the user authentication section 38 receives a distribution request, the channel secret key distribution section 32 distributes the channel secret key unique to the channel X(4) encrypted by the encryption section 33 to the chat client 1b through the channel X(4).

Figure 8:
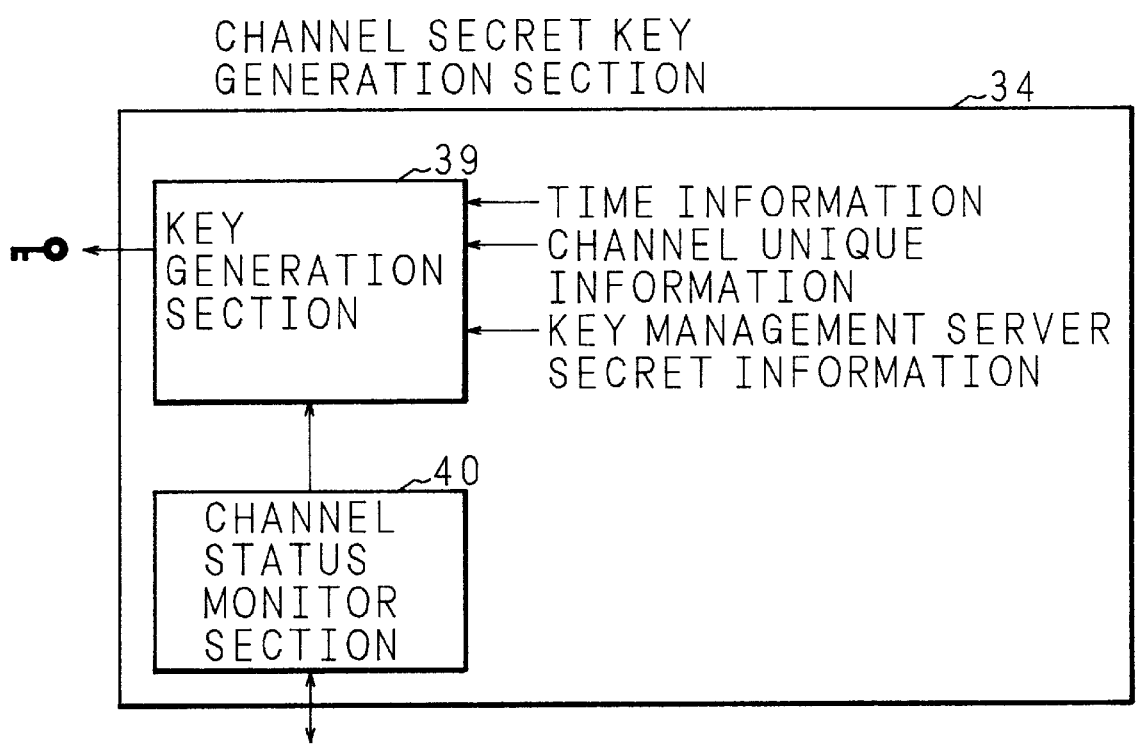
FIG. 8 is a block diagram showing an example configuration of the channel secret key generation section of FIG. 7.

FIG. 8 is a block diagram showing an example configuration of the essential parts of the channel secret key generation section 34. The channel secret key generation section 34 includes a channel status monitor section 40 for monitoring the status of each channel managed by the chat server 2 (FIG. 7) and a key generation section 39 for generating a channel secret key of each channel the status of which is monitored by the channel status monitor section 40. The key generation section 39 generates a channel secret key by multiplying the hash function such as MD 5 by the time information (date and time of key generation, and the information changing from time to time), the information unique to the channel, the secret information of the key management server 3b (the secret information held only by the corresponding terminal) or a random number (random information).

When the channel status monitor section 40 detects that the user connected to the channel becomes zero, the key generation section 39 generates the channel secret key again. The channel secret key distribution section 32 (FIG. 7) distributes the channel secret key thus generated again to the chat client.

The timing (opportunity) of generating the channel secret key again is when the channel status monitor section 40 detects that the first user is connected to the channel from the state zero of the user or it may be the time when the communication in the channel is detected to cease for at least a predetermined time.

Also, assume that a membership channel is available in which a member management server exists for managing the member data base of the channel at the same position as the key management server of the same channel (visible to the client from the chat server) and the user joins or withdraws from the member management server by some means or other. Each time a member withdraws, the member management server can issue a command to the key management server to generate the channel secret key again. In such a case, the key management server and the member management server may be integrated with each other.

Also, in the case where the deadline of the key is written in the channel secret key and has passed, the key management server can generate the channel secret key again. Once the deadline of the key is passed, the chat client requests the key management server to acquire a new key. The chat client holds the key for some time after the deadline thereof, and can decrypt the message encrypted by the old key using the key ID added to the encryption message. The key management server, when finding a chat client transmitting the encrypted message past the deadline, distributes a new key.

The chat client 1b (FIG. 7), on the other hand, includes a channel selection section 10 for selecting a channel to be connected, a user authentication information sending section 11a, a channel secret key receiving section 12 and a channel secret key decryption section 13. The user authentication information sending section 11a requests a channel secret key unique to the channel X(4) from the key management server 3b through the channel X(4) selected by the channel selection section 10, while at the same time encrypting the user authentication information using the secret key of the user acquired from the public key management server and further encrypting and sending the encrypted authentication information out using the public key of the key management server 3b acquired from the public key management server. The channel secret key receiving section 12 receives the channel secret key requested by the user authentication information sending section 11a. The channel secret key decryption section 13 decrypts the channel secret key received by the channel secret key receiving section 12 using the user secret key acquired from the public key management server.

This chat client 1b includes an input unit 14 for receiving the input signal from a keyboard (not shown), an encryption section 15 for encrypting the input signal received by the input unit 14 by the channel secret key decrypted by the channel secret key decryption section 13, a transmission section 16a for transmitting the input signal encrypted by the encryption section 15 to the channel X(4), a receiving section 17 for receiving the signal arriving from other chat clients through the channel X(4), a decryption section 18a for decrypting the signal received by the receiving section 17 using the channel secret key, and an output unit 19 for converting into a character, outputting and displaying the received signal decrypted by the decryption section 18a on a display screen (not shown).

Now, the operation of the chat system having the above-mentioned configuration will be explained.

When the chat client 1b is connected to the channel X(4), the encryption section 33 of the key management server 3b encrypts the channel secret key generated by the channel secret key generation section 34 using the public key acquired from the public key management server 37a by the public key acquisition section 37a. The public key acquisition section 37a holds the public key acquired from the public key management server for a predetermined length of time and thus saves the time required for the public acquisition section 37a to acquire the public key before the communication is started by the chat client 1b.

The user authentication section 38 receives a distribution request for the channel secret key unique to the channel X(4) from the chat client 1b through the channel X(4). At the same time, the distribution request is encrypted by the user secret key by the chat client 1b, so that an authentication information is received which is further encrypted using the public key of the key management server 3b acquired from the public key management server. Also, the user authentication section 38 decrypts the received authentication information using the secret key of the key management server 3b and the user public key, judges whether the authentication information thus decrypted is correct or not, and when the authentication information is correct, accepts the distribution request for the channel secret key.

When the user authentication section 38 accepts the distribution request for the channel secret key from the chat client 1b, the channel secret key distribution section 32 distributes the channel secret key unique to the channel X(4) encrypted by the encryption section 33 to the chat client 1a through the channel X(4).

When the user having the public key acquired by the public key acquisition section 37a is connected to a plurality of channels, the encryption section 33 encrypts the channel secret key unique to each channel using the same public key regardless of the channel involved. The channel secret key distribution section 32 distributes these channel secret keys encrypted by the encryption section 33.

The user authentication information sending section 11a of the chat client 1b requests a channel secret key unique to the channel X(4) from the key management server 3b through the channel X(4) selected by the channel selection section 10. At the same time, the user authentication information is encrypted using the user secret key acquired from the public key management server (not shown), and further encrypted and sent out using the public key of the key management server 3b acquired from the public key management server.

The channel secret key receiving section 12 receives the channel secret key requested by the user authentication information sending section 11a, and the channel secret key decryption section 13 decrypts the received channel secret key using the user secret key acquired from the public management server.

The input signal received by the input unit 14 is encrypted by the encryption section 15 using the channel secret key decrypted by the channel secret key decryption section 13, and the input signal thus encrypted is transmitted by the transmission section 16a to the channel X(4). In the process, the transmission section 16a transmits also the information indicating the encryption added to the communication data encrypted by the encryption section 15.

The signal arriving from other chat clients through the channel X(4) is received by the receiving section 17. The signal received by the receiving section 17 is decrypted using the channel secret key by the decryption section 18a in the case where the information indicating the encryption is added thereto. The received signal decrypted by the decryption section 18a is converted into a character and displayed on a display screen (not shown) by the output unit 19. In the case where the information indicating the encryption is not added to the signal received by the receiving section 17, the signal represents a plaintext and is sent to the output unit 19 without being decrypted by the decryption section 18a. The output unit 19 converts the signal into a character and displays it on a display screen (not shown).

The channel secret key includes the ID of the key itself. The key ID is given by a serial number indicating the order in which the key is issued by the key management server. The key management server distributes the channel secret key including the ID in encrypted form to the chat clients.

Also, the ID of the key used for encryption can be used as an example of information indicating the fact of encryption.

Embodiment 3

Figure 9:
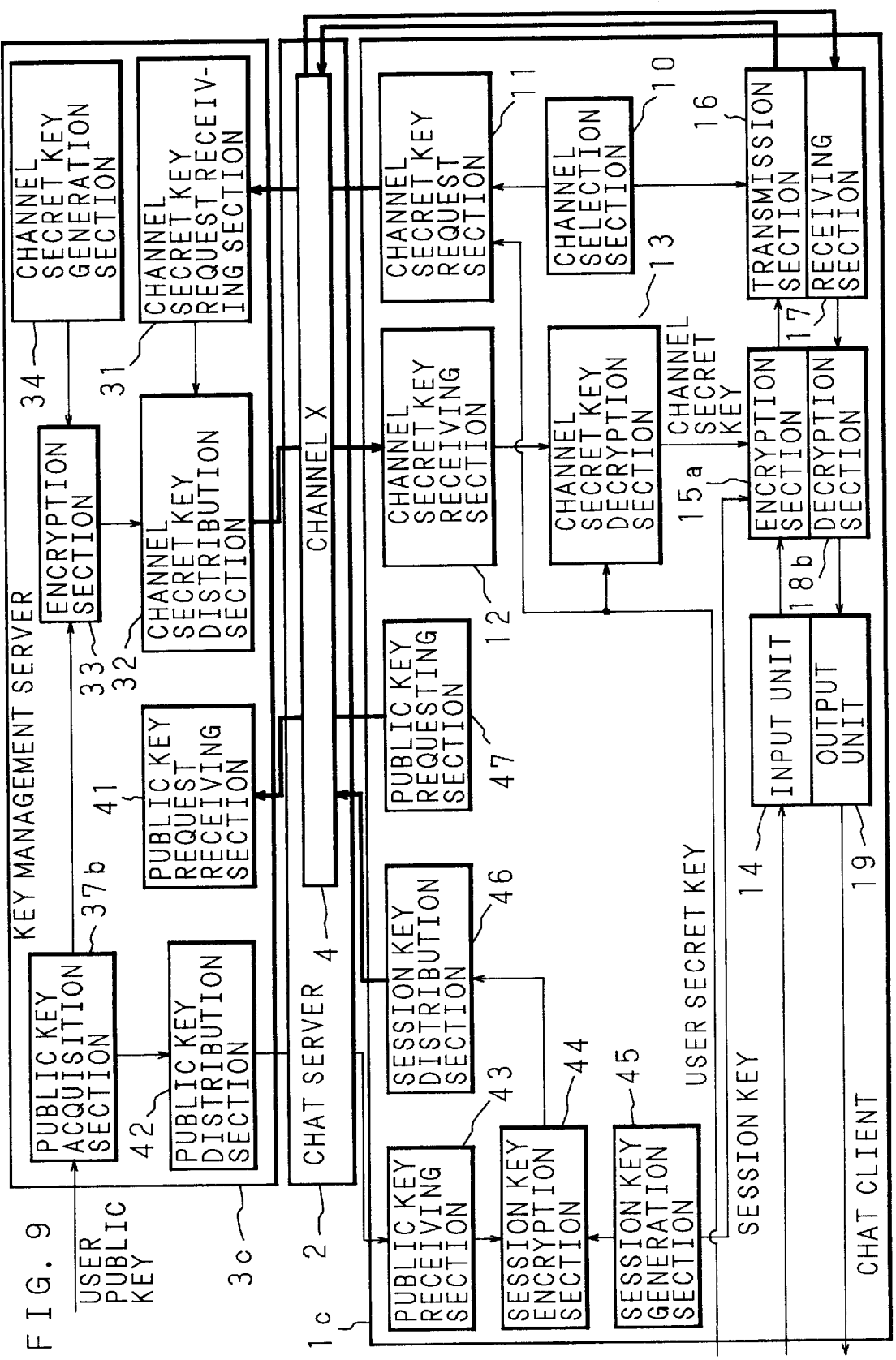
FIG. 9 is a block diagram showing an example configuration of a chat system according to a third embodiment.

FIG. 9 is a block diagram showing a configuration of the essential parts of a third embodiment of a key management server, a chat system terminal unit and a chat system according to this invention. The key management server 3c constituting the chat system terminal unit includes a channel secret key generation section 34 and a pubic key acquisition section 37b. The channel secret key generation section 34, likewise in the first embodiment, generates a channel secret key unique to each channel for encrypting/decrypting the communication data exchanged through a plurality of channels managed by one or more chat servers. When the chat client 1c is connected to the channel X(4) managed by the chat server 2, the public key acquisition section 37b acquires the public key unique to the particular user from an external public key management server (not shown), while at the same time acquiring the public key unique to other users as required and registering them with the user names.

The key management server 3c includes an encryption section 33, a channel secret key request receiving section 31, a channel secret key distribution section 32, a public key request receiving section 41 (receiving means) and a public key distribution section 42 (distribution means). The encryption section 33 3 encrypts the channel secret key unique to the channel X(4) generated by the channel secret key generation section 34 using the public key unique to the user acquired by the public key acquisition section 37b. The channel secret key request receiving section 31 receives the distribution request for the channel secret key from the chat client 1c through the channel X(4). When the channel secret key request receiving section 31 receives the distribution request, the channel secret key distribution section 32 distributes the channel secret key encrypted by the encryption section 33 to the chat client 1c through the channel X(4). The public request receiving section 41 receives the distribution request for the public key of the remote user for the chat client 1c from the chat client 1c. When the public key request receiving section 41 receives a distribution request, the public key distribution section 42 distributes the public key of the remote user acquired by the public key acquisition section 37b to the chat client 1c.

The chat client 1c, like in the first embodiment, includes a channel selection section 10 for selecting the channel to be connected, a channel secret key request section 11 for requesting a channel secret key unique to the channel X(4) through the channel X(4) selected by the channel selection section 10, a channel secret key receiving section 12 for receiving the channel secret key requested by the channel secret key request section 11, and a channel secret key decryption section 13 for decrypting the channel secret key received using the channel secret key receiving section 12 by means of the secret key (user secret key) acquired from the public key management server.

The chat client 1c also includes a session key generation section 45 (session key generation means), a public key request section 47 (requesting means), a pubic key receiving section 43 (receiving means), a session key encryption section 44 (encryption means) and a session key distribution section 46 (session key distribution means). The session key generation section 45 generates a session key for encrypting/decrypting the communication data in the one-to-one communication in the channel X(4). The public key request section 47 requests a public key for the remote user from the public key requesting server 3c through the channel X(4). The public key receiving section 43 receives the public key requested by the public key request section 47. The session key encryption section 44 encrypts the session key generated by the session key generation section 45 by the public key received by the pubic key receiving section 43. The session key distribution section 46 distributes the session key encrypted by the session key encryption section 44 to the chat client (terminal unit) of the remote user through the channel X(4).

The chat client 1c includes an input unit 14 for receiving the input signal from a keyboard (not shown), an encryption section 15a and a receiving section 17. The encryption section 15a encrypts the input signal received by the input unit 14 using the channel secret key decrypted by the channel secret key decryption section 13. At the same time, at the time of one-to-one communication in the connected channel, the input signal received by the input unit 14 is encrypted using the session key generated by the session key generation section 45. The transmission section 16 transmits the input signal encrypted by the encryption section 15a to the channel X(4). The receiving section receives the signal arriving from other chat clients through the channel X(4).

The chat client 1c also includes a decryption section 18b and an output unit 19. The decryption section 18b decrypts the signal received by the receiving section 17 using the channel secret key, and also decrypts the signal received by the receiving section 17 using the session key generated by the session key generation section 45 at the time of one-to-one communication in the connected channel. The output unit 19 converts the received signal decrypted by the decryption section 18b into a character, outputs and display it on a display screen (not shown).

Now, the operation of a chat system having the above-mentioned configuration will be explained.

When the chat client 1c is connected to the channel X(4), the encryption section 33 of the key management server 3c encrypts the channel secret key unique to the channel X(4) generated by the channel secret key generation section 34 using the public key acquired from the public key management server by the channel key acquisition section 37b. When the channel secret key request receiving section 31 receives the distribution request of the channel secret key from the chat client 1c through the channel X(4), the channel secret key distribution section 32 distributes the channel secret key encrypted by the encryption section 33 to the chat client 1c through the channel X(4).

Also, when the public key request receiving section 41 of the key management server 3c receives the distribution request for the public key of the corresponding remote user from the chat client 1c, the pubic key distribution section 42 distributes the public key of the remote user acquired by the public key acquisition section 37b to the chat client 1c.

The channel secret key request section 11 of the chat client 1c requests the key management server 3c for the channel secret key unique to the channel X(4), and the channel secret key receiving section 12 receives the requested channel secret key. The channel secret key received by the channel secret key receiving section 12 is decrypted by the channel secret key decryption section 13 using the user secret key acquired from the public key management server.

Also, the session key generation section 45 of the chat client 1c generates a session key at the time of one-to-one communication in the channel X(4), and the public key request section 47 requests the public key of the remote user from the key management server 3c through the channel X(4). The public key receiving section 43 receives the public key requested by the public key request section 47 from the key management server 3c through the chat server 2.

The session key encryption section 44 encrypts the session key generated by the session key generation section 45 using the public key received by the public key receiving section 43. The session distribution section 46 distributes the session key encrypted by the session key encryption section 44 to the chat clients of the remote user through the channel X(4).

The encryption section 15a of the chat client 1c encrypts the input signal received by the input unit 14 using the channel secret key decrypted by the channel secret key decryption section 13. In conducting the one-to-one communication in the connected channel, on the other hand, the encryption section 15a encrypts the input signal received by the input unit 14 using the session key generated by the session key generation section 45 or the session key acquired from the remote chat client. The transmission section 16 transmits the input signal encrypted by the encryption section 15a to the channel X(4). The receiving section 17 receives the signal arriving from other chat clients through the channel X(4).

The decryption section 18b of the chat client 1c decrypts the signal received by the receiving section 17 using the channel secret key. In one-to-one communication in the connected channel, on the other hand, the decryption section 18b decrypts the signal received by the receiving section 17 using the session key generated by the session key generation section 45 or the session key acquired from the remote chat client. The output unit 19 converts the received signal decrypted by the decryption section 18b into a character and outputs it to and displays it on a display screen (not shown).
Embodiment 4

Figure 10:
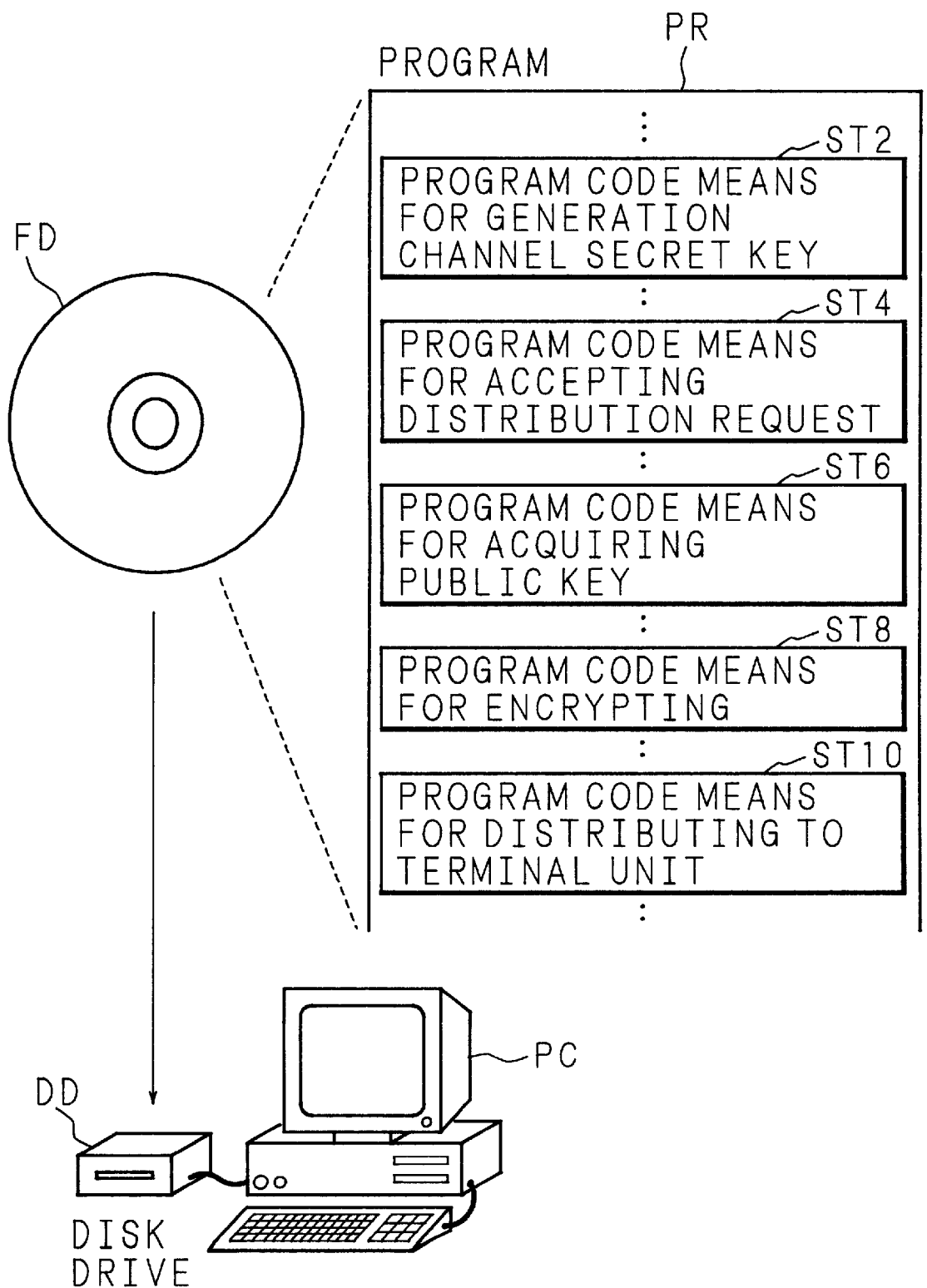
FIG. 10 is a diagram for explaining the configuration of a recording medium according to a fourth embodiment of the invention.

FIG. 10 is a diagram for explaining a configuration of a recording medium according to a fourth embodiment of this invention. In this embodiment, a flexible disk FD providing a recording medium has recorded therein a computer program PR including a program code means ST2 for generating the channel secret key unique to each channel, a program code means ST4 for receiving a distribution request of the channel secret key unique to the channel from other terminal units through the channel managed by a chat server, and a program code means ST6 for acquiring the public key unique to the user from an external unit. The channel secret key unique to each channel is for encrypting/decrypting the communication data exchanged through each of a plurality of channels managed by one or more chat servers.

Also, the flexible disk FD further includes a computer program PR having a program code means ST8 and a program code means ST10. When the program code means ST4 receives a distribution request, the program code means ST8 encrypts the channel secret key using the public key unique to the user requesting the distribution. The program code means ST10, on the other hand, distributes the channel secret key unique to the channel to the terminal unit through the channel when the program code means ST4 receives a distribution request.

The flexible disk FD is loaded in a disk drive DD and the contents thereof are read into a personal computer PC. The computer program PR thus read is used for controlling the personal computer PC.

The configuration and operation of other parts are similar to those of the terminal unit of the chat system according to the first embodiment and will not be described.

Figure 11:
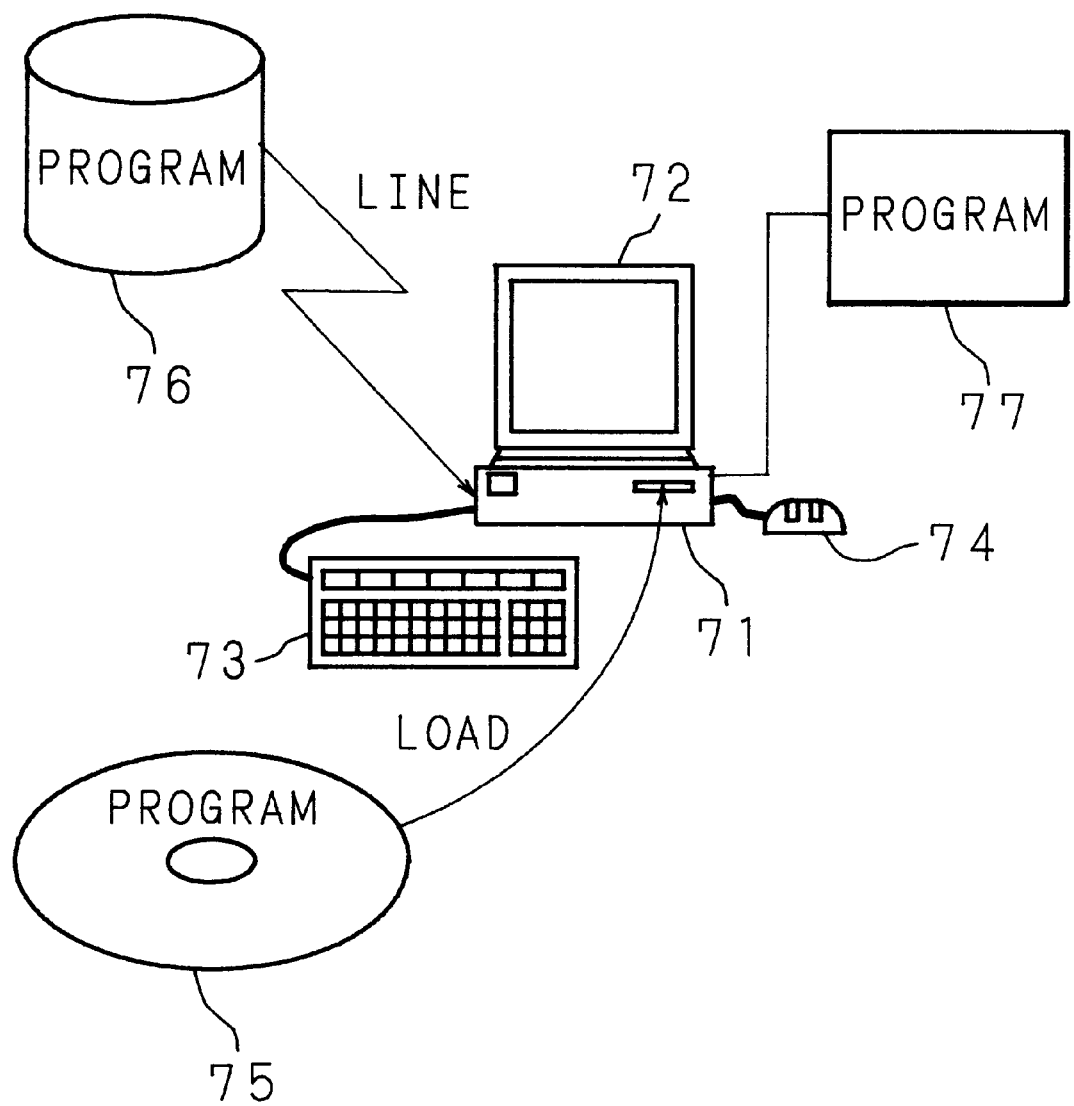
FIG. 11 is a diagram for explaining a recording medium according to another embodiment.

The recording medium according to the invention can be embodied as shown in FIG. 11 instead of as shown above. This embodiment comprises a personal computer 71 providing a processor, a display 72 for displaying character data or the like, and input units including a keyboard 73 and a mouse 74. The personal computer 71 is loaded with a program PR (FIG. 10) as described above from various recording media. The recording media can be a portable recording medium 75 such as a magnetic disk or a CD-ROM. A program communication is also possible by radio or wire with the personal computer 71. For example, a line end memory 76 may be arranged at a center, or a RAM, hard disk or the like memory 77 on the processor side may be mounted in the personal computer 71.

The key management server according to this invention has the following effects. First, the communication is kept secret even when using a chat server of low reliability.

Also, the communication can be kept secret for each of a plurality of groups of the terminal units in the same channel.

Further, the channel secret key can be encrypted by the public key and distributed to the terminal unit.

Furthermore, the communication can be kept secret even when a chat server of low reliability is used without distributing the channel secret key to outsiders.

In addition, it is difficult to duplicate the channel secret key illegally, and therefore the communication can be kept secret even in the case where a chat server of low reliability is used.

What is more, even when the channel secret key is duplicated illegally, the validity thereof is lost within a short time. Therefore, the communication is kept secret even when a chat server of low reliability is used.

Further, it is not necessary to acquire the corresponding public key each time the terminal unit is connected with a channel.

Furthermore, the user is not required to have a plurality of public keys, and the public key acquisition means can easily manage the acquired keys.

In addition, the terminal unit of the chat system according to this invention has the following effects. First, one-to-one communication is possible while keeping secret even in the channel connecting three or more terminal units.

Also, the communication data requiring security can be encrypted whereas the communication data of no security can be communicated in a plaintext.

Further, the communication can be kept secret without resorting to the reliability of the chat server.

Also, with the computer controlled by the computer program recorded in the recording medium according to the invention, the communication can be kept secret even when using a chat server of low reliability.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A key management server constituting a first terminal unit, comprising:

channel secret key generation means for generating a channel secret key unique to each channel for encrypting/decrypting communication data exchanged through each of a plurality of channels managed by one or more chat servers;

encryption means for encrypting a channel secret key generated by said channel secret key generation means;

receiving means for receiving through a channel managed by said chat server, a distribution request for a channel secret key unique to said channel from a second terminal unit; and distribution means for distributing the channel secret key unique to said channel encrypted by said encryption means to said second terminal unit through said channel when said receiving means receives the distribution request.

2. The key management server according to claim 1, wherein said channel secret key generation means generates a channel secret key unique to each of groups which is divided so as to includes a plurality of terminal units in said channel, and said receiving means receives the distribution request for the channel secret key for each group from said second terminal unit.

3. The key management server according to claim 1, further comprising public key acquisition means for acquiring a public key unique to a user from an external unit;

wherein said encryption means encrypts the channel secret key generated by said channel secret key generation means using the public key which is acquired by said public key acquisition means and is unique to a user requesting the distribution when said receiving means receives the distribution request.

4. The key management server according to claim 3, wherein said public key acquisition means acquires said public key when said second terminal unit is connected to a channel managed by the chat server.

5. The key management server according to claim 3, wherein said public key acquisition means acquires said public key from said second terminal unit and registers said public key and the associated user name when said second terminal unit is connected to a channel managed by the chat server.

6. The key management server according to claim 1, wherein said receiving means receives a user authentication information together with the distribution request for said channel secret key, judges whether the received user authentication information is correct or not, and when judging that said authentication information is correct, accepts said distribution request.

7. The key management server according to claim 1, wherein said channel secret key generation means generates said channel secret key based on selected one of an information changing from time to time, an information unique to each channel, a secret information held only by a terminal associated with said channel and a random information.

8. The key management server according to claim 1, wherein said channel secret key generation means generates again at a predetermined opportunity the channel secret key generated and distributed, and said distribution means distributes said channel secret key generated again by said channel secret key generation means.

9. The key management server according to claim 3, wherein said public key acquisition means holds the acquired public key for a predetermined length of time.

10. The key management server according to claim 3, wherein when a user of the public key acquired by said public key acquisition means is connected to a plurality of channels, said encryption means encrypts the channel secret key unique to each channel using said public key regardless of the channel.

11. The key management server according to claim 1, further comprising:
    second receiving means for receiving a distribution request for a public key of a remote user of a second terminal unit received from said second terminal unit through a channel managed by a chat server; and
    second distribution means for distributing said public key acquired by said public key acquisition means to said second terminal unit when said second receiving means receives the distribution request.

12. A terminal unit for a chat system to conduct the one-to-one communication with a terminal unit of a remote user, comprising:
    session key generation means for generating a session key for encrypting/decrypting communication data for the one-to-one communication in a channel managed by a chat server;
    means for requesting a public key from a key management server for distributing said public key of a remote user through a channel managed by the chat server;
    means for receiving said public key requested by said public key requesting means;
    encryption means for encrypting the session key generated by said session key generation means using the public key received by said public key receiving means; and
    means for distributing the session key encrypted by said encryption means to the terminal unit of a remote user through said channel.

13. A chat system terminal unit comprising:
    encryption means for encrypting communication data using the channel secret key unique to each channel distributed from a key management server for encrypting/decrypting the communication data exchanged through each of a plurality of channels managed by one or more chat servers;
    means for outputting the communication data encrypted by said encryption means together with the information indicating an encryption to a channel managed by a chat server; and
    means for decrypting the communication data by said channel secret key when the communication data received from said channel includes the information indicating the encryption.

14. A chat system comprising:
    a chat server for managing a plurality of channels for exchanging communication data; and
    a key management server constituting a first terminal unit for distributing a channel secret key unique to each channel to a second terminal unit for encrypting/decrypting the communication data exchanged through each of a plurality of channels managed by said one or a plurality of chat servers;
    wherein said key management server includes:
        channel secret key generation means for generating the channel secret key;
        encryption means for encrypting the channel secret key generated by said channel secret key generation means;
        receiving means for receiving a distribution request for the channel secret key unique to each channel from said second terminal unit through a channel managed by said chat server; and
        distribution means for distributing the channel secret key unique to said channel encrypted by said encryption means through said channel to said second terminal unit when said receiving means receives said distribution request.

15. The chat system according to claim 14, wherein said key management server further includes:
    second receiving means for receiving a distribution request for a public key of a remote user of a second terminal unit sent from said second terminal unit through a channel managed by a chat server; and
    second distribution means for distributing said public key acquired by said public key acquisition means to said second terminal unit when said second receiving means receives the distribution request.

16. A chat system comprising:
    a chat server for managing a plurality of channels for exchanging communication data; and
    a terminal unit for conducting communication through a channel managed by said chat server,
    wherein said terminal unit includes:
        session key generation means for generating a session key for encrypting/decrypting communication data for one-to-one communication in a channel managed by the chat server;
        means for requesting a public key from a key management server for distributing the public key of a remote user through a channel managed by the chat server;
        means for receiving said public key requested by said public key requesting means;

encryption means for encrypting the session key generated by said session key generation means using the public key received by said public key receiving means; and means for distributing the session key encrypted by said encryption means to the terminal unit of a remote user through said channel.

17. The chat system according to claim 14, further comprising:

a terminal unit for conducting the communication through a channel managed by said chat server, wherein said terminal unit includes:

session key generation means for generating a session key for encrypting/decrypting communication data for one-to-one communication in a channel managed by the chat server;

means for requesting a public key from a key management server for distributing the public key of a remote user through a channel managed by the chat server;

means for receiving said public key requested by said public key requesting means;

encryption means for encrypting a session key generated by said session key generation means using the public key received by said public key receiving means; and means for distributing the session key encrypted by said encryption means to the terminal unit of a remote user through said channel.

18. The chat system according to claim 15, further comprising:

a terminal unit for conducting communication through a channel managed by said chat server, wherein said terminal unit includes:

session key generation means for generating a session key for encrypting/decrypting communication data for one-to-one communication in a channel managed by the chat server;

means for requesting a public key from a key management server for distributing the public key of a remote user through a channel managed by the chat server;

means for receiving said public key requested by said public key requesting means;

encryption means for encrypting the session key generated by said session key generation means using the public key received by said public key receiving means; and means for distributing the session key encrypted by said encryption means to the terminal unit of the remote user through said channel.

19. A computer memory product having computer readable program code means, said computer readable program code means comprising:

first computer readable program code means for causing a computer to generate a channel secret key unique to each channel for encrypting/decrypting the communication data exchanged through each of a plurality of channels managed by one or more chat servers;

second computer readable program code means for causing the computer to receive, through a channel managed by the chat server, a distribution request for a channel secret key unique to the channel from one terminal unit; and third computer readable program code means for causing the computer to distribute the channel secret key unique to said channel generated by said first computer program code means through said channel to said terminal unit when said second computer program code means receives the distribution request.

20. The computer memory product according to claim 19, further comprising:

fourth computer readable program code means for causing the computer to acquire a public key unique to a user from an external unit; and fifth computer readable program code means for causing the computer to encrypt the channel secret key generated by said first computer program code means using the public key acquired by said fourth computer program code means unique to the user requesting the distribution when said second computer program code means receives said distribution request;

wherein said second computer program code means distributes the channel secret key encrypted by said fifth computer program code means to said terminal unit through said channel.

\* \* \* \* \*